(12) United States Patent
Toshok et al.

(10) Patent No.: US 10,635,830 B2
(45) Date of Patent: Apr. 28, 2020

(54) INGEST PROXY AND QUERY REWRITER FOR SECURE DATA

(71) Applicant: Hound Technology, Inc., San Francisco, CA (US)

(72) Inventors: Christopher Toshok, San Francisco, CA (US); Benjamin Hartshorne, Berkeley, CA (US); Christine Yen, San Francisco, CA (US); Charity Majors, San Francisco, CA (US)

(73) Assignee: Hound Technology, Inc., San Francisco, CA (US)

( * ) Notice: Subject to any disclaimer, the term of this patent is extended or adjusted under 35 U.S.C. 154(b) by 212 days.

(21) Appl. No.: 15/826,495

(22) Filed: Nov. 29, 2017

(65) Prior Publication Data

US 2018/0150645 A1 May 31, 2018

Related U.S. Application Data

(60) Provisional application No. 62/427,758, filed on Nov. 29, 2016.

(51) Int. Cl.
*G06F 21/62* (2013.01)
*H04L 29/06* (2006.01)

(52) U.S. Cl.
CPC ...... *G06F 21/6218* (2013.01); *G06F 21/6254* (2013.01); *H04L 63/0281* (2013.01); *H04L 63/0428* (2013.01); *H04L 63/123* (2013.01); *H04L 63/0272* (2013.01); *H04L 63/06* (2013.01)

(58) Field of Classification Search
None
See application file for complete search history.

(56) References Cited

U.S. PATENT DOCUMENTS

| 8,862,537 | B1   | 10/2014 | Kurtic et al. |           |
|-----------|------|---------|---------------|-----------|
| 9,608,809 | B1 * | 3/2017  | Ghetti ...... | H04L 9/083 |
| 9,767,294 | B2 * | 9/2017  | Mori ........ | G06F 21/602 |
| 10,387,643| B2 * | 8/2019  | Bendel ...... | G06F 21/629 |
| 2015/0379303 | A1 * | 12/2015 | LaFever ...... | G06F 21/6218 |
|           |      |         |               | 726/28    |

(Continued)

OTHER PUBLICATIONS

International Search Report and Written Opinion, PCT/US17/63802, dated Feb. 16, 2018 (13 pages).

(Continued)

*Primary Examiner* — Kambiz Zand
*Assistant Examiner* — Arezoo Sherkat
(74) *Attorney, Agent, or Firm* — Patent Law Works LLP (57) ABSTRACT

A system for providing an ingest proxy and query rewriter for secure data is described. In an example implementation, the system may include a proxy configured to obfuscate data, generate maps of the obfuscated data to the original data, and send the obfuscated data to an analysis server. The analysis server may be configured to generate analysis data relevant to the obfuscated data and the original data by analyzing the obfuscated data. The analysis server may send the analysis data and an identification of the obfuscated data to a user device in response to a request from the user device. The user device may be configured to detect the identification of the obfuscated data in the signal received from the analysis server and retrieve the analysis data from a client device via the proxy.

11 Claims, 5 Drawing Sheets

(56) References Cited

U.S. PATENT DOCUMENTS

2016/0132886 A1    5/2016  Burke et al.
2017/0041298 A1*   2/2017  Lehnhardt ........... G06F 21/6227
2017/0091446 A1*   3/2017  Bendel .................... G06F 21/53
2017/0097970 A1*   4/2017  Bendel .................. G06F 16/254

OTHER PUBLICATIONS

Wikipedia, "Paillier cryptosystem," Mar. 12, 2018, retrieved from https://en.wikipedia.org/wiki/Paillier_cryptosystem (5 pages).

* cited by examiner

INGEST PROXY AND QUERY REWRITER FOR SECURE DATA

CROSS-REFERENCE TO RELATED APPLICATIONS

This application claims the benefit under 35 U.S.C. § 119(e) of U.S. Provisional Application No. 62/427,758, entitled "Ingest Proxy and Query Rewriter for Secure Data," filed on Nov. 29, 2016, the entire contents of which are incorporated herein by reference.

BACKGROUND

The present specification generally relates to the field of providing analysis on secure data. For instance, some implementations of the present specification relate to systems and processes for hosting a service using a secure client-side proxy.

Computing systems, especially those that are large and complex, may benefit from analysis on data generated by the systems, for example, to address problems with latency, bugs in computer code, malicious attacks, or other systemic issues. These issues can be difficult and time-consuming for an organization to address. Some existing solutions include on-premises systems executed by the computing systems of an organization, but these on-premises systems consume substantial computing resources and require substantial maintenance by the organization. Other solutions include off-premises systems where the organization's data is hosted by a third-party analysis server; however, some organizations deal with secure data, such as personally identifiable information, personal health information, etc., which, when transferred off a local computing system or secure network of the organization, may expose the data to security risks. Accordingly, it can be difficult for such organizations to analyze issues in their computing systems without exposing their data to security risks. Further, the computing systems of such organizations may not have the computing resources to provide the analysis.

Accordingly, a system is needed to allow secure analysis and access to an organization's data while decreasing the risk associated with the data being stored or accessed by a service hosted off of the computing system or secure network of the organization.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes receiving, by an analysis server, obfuscated data from a remote proxy, the obfuscated data being an obfuscated version of original data, the remote proxy being located at a remote network location from the analysis server. The aspect may also include generating, by the analysis server, analysis data relevant to the obfuscated data and to the original data by analyzing the obfuscated data. The aspect may also include receiving, by the analysis server, a request from a remote user device for the analysis server to send the original data and the analysis data to the remote user device. The aspect may also include retrieving, by the analysis server, the obfuscated data and the analysis data from a database based on the request. The aspect may also include transmitting, by the analysis server, the analysis data to the remote user device. The aspect may also include transmitting, by the analysis server, a signal to the remote user device, the signal directing the remote user device to retrieve the original data from the remote proxy. Other embodiments of this aspect include corresponding computer systems, apparatus, and computer programs recorded on one or more computer storage devices, each configured to perform the actions of the methods.

Implementations may include one or more of the following features. The computer-implemented method where: the original data includes events and the obfuscated data includes timestamps associated with the events; and analyzing the obfuscated data includes searching for patterns in the obfuscated data using the timestamps. The computer-implemented method where the original data includes log files, the log files including records of events that occur on a remote client device, the remote client device being communicatively coupled with the remote proxy. The computer-implemented method where the analysis server is separated from the remote client device and the remote proxy by a firewall. The computer-implemented method where: the obfuscated data includes a hash value of the original data; the remote user device is configured to detect the hash value received from the analysis server and to automatically send the hash value to the remote proxy; and the remote user device is connected to the remote proxy via a virtual private network when the remote user device is sending the signal to the remote proxy and receiving the original data from the remote proxy. Implementations of the described techniques may include hardware, a method or process, or computer software on a computer-accessible medium.

One general aspect includes a computer-implemented method including: receiving, by a proxy, structured data; obfuscating, by the proxy, the structured data to generate obfuscated data; generating, by the proxy, a map of the obfuscated data to the structured data; transmitting, by the proxy, the obfuscated data to an analysis server, the analysis server configured to perform analysis of the obfuscated data; receiving, by the proxy, a signal from a user device, a signal requesting that the proxy send the obfuscated data to the user device; determining, by the proxy, the structured data corresponding to the obfuscated data using the map and the signal received from the user device; retrieving, by the proxy, the structured data from a database; and transmitting, by the proxy, the structured data to the user device. Other embodiments of this aspect include corresponding computer systems, apparatus, and computer programs recorded on one or more computer storage devices, each configured to perform the actions of the methods.

Implementations may include one or more of the following features. The computer-implemented method where: obfuscating, by the proxy, the structured data to generate the obfuscated data includes applying a secure hash algorithm to the structured data. The computer-implemented method where: the structured data includes columns, the columns having column names and values; and obfuscating, by the proxy, the structured data includes obfuscating the column names and the values of the structured data. The computer-implemented method further including: assigning, by the proxy, one or more keys to the structured data with which to obfuscate the structured data; retrieving, by the proxy, the one or more keys; and de-obfuscating, by the proxy, the obfuscated data using the one or more keys to determine the structured data corresponding to the obfuscated data. The computer-implemented method further including: storing, by the proxy, the one or more keys in the map based on the assignment of the one or more keys to the structured data; and determining, by the proxy, which of the one or more keys to use to de-obfuscate the obfuscated data using the map. The computer-implemented method further including: assigning, by the proxy, a timestamp to the one or more keys; associating, by the proxy, the timestamp to the obfuscated data based on when the obfuscated data was generated; and using, by the proxy, the timestamp to determine which of the one or more keys to use in de-obfuscating the obfuscated data. The computer-implemented method where: the obfuscated data includes a hash value of the structured data; the user device is configured to detect the hash value received from the analysis server and to automatically send the hash value to the proxy; and the user device is connected to the proxy via a virtual private network when the user device receives the structured data from the proxy. Implementations of the described techniques may include hardware, a method or process, or computer software on a computer-accessible medium.

One general aspect includes a system including: a remote proxy configured to transmit obfuscated data to an analysis server, the remote proxy being located at a remote network location from the analysis server, the obfuscated data being an obfuscated version of original data; the analysis server configured to receive obfuscated data from the remote proxy, generate analysis data relevant to the obfuscated data and to the original data by analyzing the obfuscated data, retrieve the obfuscated data and the analysis data from a database based on a request received from a remote user device, transmit the analysis data to the remote user device, and transmit a signal to the remote user device identifying the obfuscated data. The system also includes the remote user device configured to transmit the request from for the analysis server to send the original data and the analysis data to the remote user device, and retrieve the original data from the remote proxy in response to receiving the signal. Other embodiments of this aspect include corresponding computer systems, apparatus, and computer programs recorded on one or more computer storage devices, each configured to perform the actions of the methods.

Implementations may include one or more of the following features. The system, where the original data includes events and the obfuscated data includes timestamps associated with the events; and analyzing the obfuscated data includes searching for patterns in the obfuscated data using the timestamps. The system, where the original data includes log files, the log files including records of events that occur on a remote client device, the remote client device being communicatively coupled with the remote proxy. The system, where the obfuscated data includes a hash value of the original data; and the remote user device is further configured to detect the hash value received from the analysis server and to automatically send the hash value to the remote proxy. The system, where the remote user device is connected to the remote proxy via a virtual private network when the remote user device receives the original data from the remote proxy. The system, where the remote proxy is further configured to receive, from a client device, original data; obfuscate the original data to generate the obfuscated data; and generate a map of the obfuscated data to the original data. The system, where the remote proxy is further configured to determine the original data corresponding to the obfuscated data using the map and the request received from the remote user device. The system may also include transmit the original data to the remote user device. The system, where obfuscating the original data to generate the obfuscated data includes applying a secure hash algorithm to the original data. Implementations of the described techniques may include hardware, a method or process, or computer software on a computer-accessible medium.

Other embodiments of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

The disclosure is illustrated by way of example, and not by way of limitation in the figures of the accompanying drawings in which like reference numerals are used to refer to similar elements.

The systems and methods described herein provide an integration technology for running secure data, such as personally identifiable information ("PII") or personal health information ("PHI"), with a hosted service using a proxy 118 on the client side. The proxy 118 may generate hashed tokens and maps, which may be used by the proxy 118 to serve original data based on queries from user devices 104. In some implementations, the browser operable on a user device 104 may connect to the proxy 118, for example, via a virtual private network ("VPN") to decrypt the tokens received from a separate analysis server 110 using the maps. In some implementations, the user device 104 may populate the strings received from the analysis server 110 with the original values received from the proxy 118. Accordingly, the integration of data from the proxy 118 in the analysis server 110 may be transparent to an end user using the user device 104. It should be noted that, for the purposes of this description, original data indicates any data that may be received and obfuscated by a proxy 118 and may also indicate the data after retrieval or de-obfuscation by the proxy 118 (e.g., when data is obfuscated, the un-obfuscated version of the data may be referred to as original data).

In some implementations, the technology includes an architecture for running a multi-tenant platform, for example, on the analysis server 110, for serving multiple client systems 116 whose data is subject to security restrictions (e.g., PII or PHI security regulations). According to some implementations, the analysis server 110 receives obfuscated data from the proxy 118, but the original data is not uploaded to the analysis server 110. Because the original data is served by the proxy 118 (rather than the analysis server 110) and maps of the obfuscated data are stored on the client system 116, the data policies of the client computing system 116 may cover the secure data at all times.

The hybrid system described in this disclosure increases computational efficiency of a client computing system by moving the analysis off of the client computing system to a remotely located dedicated system. Additionally, this architecture improves security, because the secure data can remain on the client system 116. Further, because the analysis server 110 may be a dedicated system that may be used for a plurality of client computing systems, the amount of maintenance, updates, etc., on the analysis server 110 may be reduced over a plurality of client devices 120 each use their own on-premises analysis engines 112.

Figure 1:
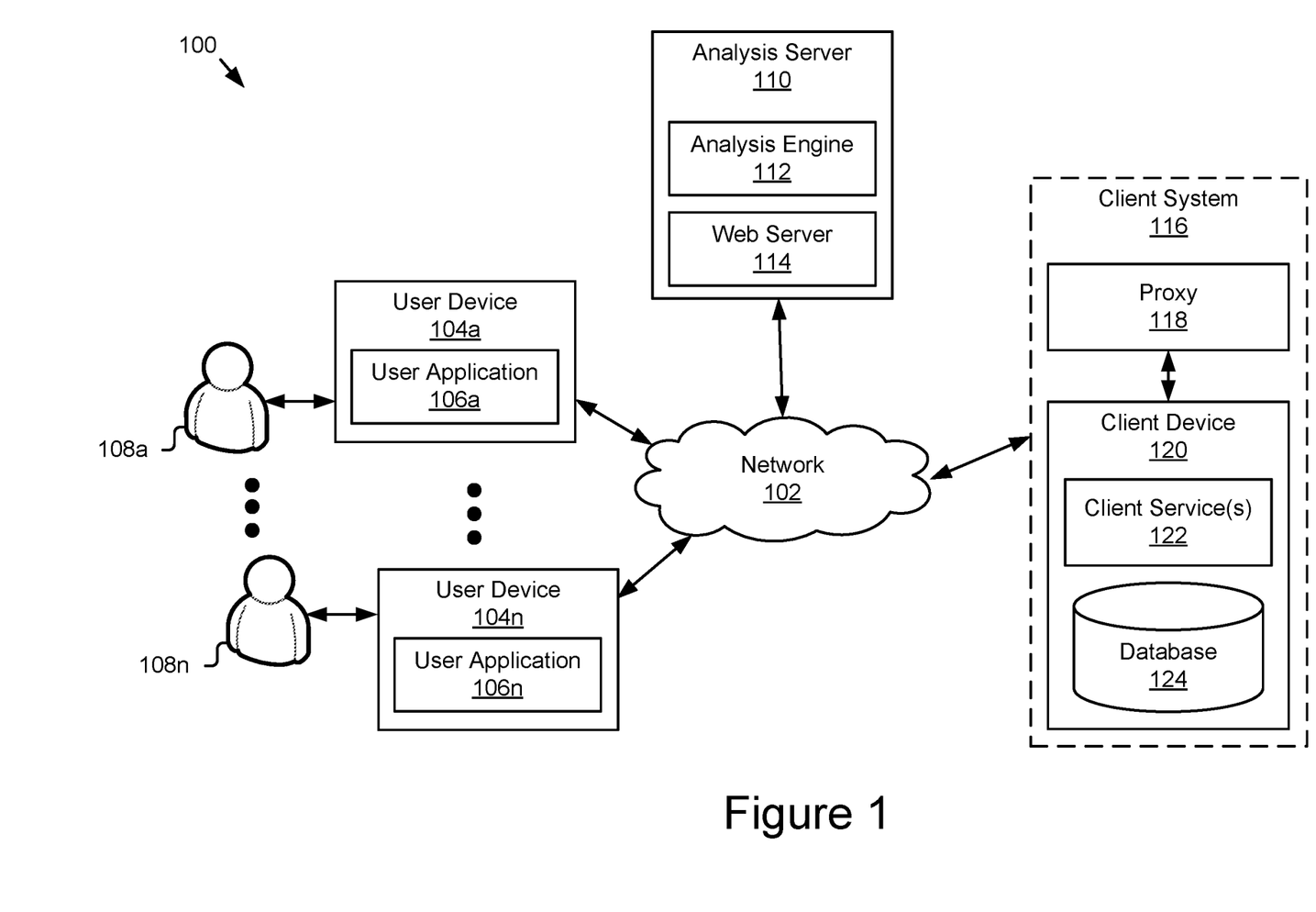
FIG. 1 is a block diagram illustrating an example ingest proxy and query rewriter system.

FIG. 1 is a block diagram illustrating an example ingest proxy and query rewriter system 100. The ingest proxy and query rewriter system may enable analysis and hosting of secure data by an analysis server 110 while sensitive data is retained on the client system 116. For example, an organization, such as a healthcare startup, that deals with Medicare, Medicaid, or other secure information may wish to offload the computational tasks of analysis to hosted service. For instance, the computing system of the organization may have issues with latency on its website, denial of service attacks, or other systemic inefficiencies or issues. Accordingly, a computing device (also referred to herein as a client device 120) of the organization may upload operational data (e.g., log files, IP addresses, system information, etc.) in obfuscated form to the analysis server 110. The analysis server 110 tracks patterns, looks at trends, and/or performs other analysis to identify issues within the computing system of the organization. For example, the analysis server 110 may break down data, group data, generate histograms, etc., using the obfuscated data provided by the computing system of the client/organization. This may be particularly beneficial, when the computing systems of the organization have tens or hundreds of services, client devices 120, or databases to be analyzed. Additionally, the technology described herein allows a user device 104 coupled with the computing systems (e.g., the client system 116) of the organization to access both the analysis data and the original data in a seamless fashion.

In some implementations, the technology may include a proxy 118 running on the client's computing systems 116 (e.g., within the secure network of the client's computing systems 116) and, instead of streaming events directly to the analysis server 110, the client computing system 116 (also referred to as the client system 116) may stream events to the proxy 118. The proxy 118 may obfuscate the data (e.g., generate a hash or encrypted representation of the data), store mapping of the obfuscated data to an event, and forward the obfuscated data to the analysis server 110.

When a user, such as an engineer, wants to debug the client system 116 or otherwise look at analysis from the analysis server 110, the user may use a user device 104 to access the analysis data and the original data. For example, in some implementations, the user device 104 may connect to the secure network of the client system 116 via a VPN and access the analysis server 110 through the Internet. When the analysis server 110 serves analysis data to the user device 104, it may also serve identification of the obfuscated data. The user device 104 may run code that automatically recognizes the identification of the obfuscated data and sends it to the proxy 118 which uses the identification of the obfuscated data to find the original data and serve it to the user device 104. Accordingly, the analysis may be performed on the analysis server 110, but the values may be served by the proxy 118.

The illustrated system 100 may include user devices 104a ... 104n (also referred to herein individually and/or collectively as 104), an analysis server 110, and a client system 116, which are electronically communicatively coupled via a network 102 for interaction with one another, although other system configurations are possible including other devices, systems, and networks. For example, the system 100 could include any number of client systems 116, analysis servers 110, client systems 116, networks 102, and other systems and devices. The client system 116 may be located on premises at an organization's facility or may be otherwise located within a secure network of the organization. In some implementations, the analysis server 110 may be located remotely (e.g., on the network or physical location) from one or both of the client system 116 and the user devices 104.

The network 102 may include any number of networks and/or network types. For example, the network 102 may include, but is not limited to, one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The user device 104 includes one or more computing devices having data processing and communication capabilities. The user device 104 may couple to and communicate with other user device 104 and the other entities of the system 100 via the network 102 using a wireless and/or wired connection, such as the local hub or the application server. Examples of user devices 104 may include, but are not limited to, mobile phones, tablets, laptops, desktops, netbooks, server appliances, servers, virtual machines, TVs, etc. The system 100 may include any number of user devices 104, including user devices 104 of the same or different type.

A plurality of user devices 104a ... 104n are depicted in FIG. 1 to indicate that the analysis server 110 and client system 116 may interact with multiplicity of users 108a ... 108n on a multiplicity of user devices 104a ... 104n.

The user devices 104 may also store and/or operate other software such as a user application 106 (e.g., an instance of a user application 106a ... 106n), an operating system, other applications, etc., that are configured to interact with the analysis server 110 and/or the client system 116 via the network 102. In some implementations, the user device 104 may run a user application 106. The user application 106 may communicate with the analysis server 110 and the proxy 118. For instance, the user application 106 may include a browser that may run JavaScript or other code. The user application 106 may connect to the analysis server 110 via the web server 114, receive analysis data from the analysis server 110, and may recognize signals from the analysis server 110 indicating that the user application 106 should seek un-obfuscated/original data from the proxy 118. For example, the user application 106 may be configured to recognize a hash in a stream of data received from the analysis server 110 and automatically send the hash to the proxy 118 in order to retrieve the original data represented by the hash. The user application 106 may then integrate the original data into the stream of analysis data and output it for display to the user by the user device 104.

The analysis server 110 may include a web server 114 and an analysis engine 112. In some implementations, the analysis engine 112, and web server 114 may be located on a server that is remote to the client system 116 and/or the user device 104, such that the analysis server 110 communicates with the proxy 118 to perform actions, thereby reducing complexity of the local client system 116 (e.g., the proxy 118 and client device 120). The analysis server 110 has data processing, storing, and communication capabilities, as discussed elsewhere herein. For example, the analysis server 110 may include one or more hardware servers, server arrays, storage devices and/or systems, etc. In some embodiments, the analysis server 110 may include one or more virtual servers, which operate in a host server environment.

The analysis engine 112 may include a specially programmed computing device or logic configured to analyze data received from client system 116. The analysis engine 112 may search for shapes and patterns and perform string comparisons in the received data. The analysis engine 112 may consider events and other operational data in order to discover percentiles, latencies, deviations from norms, breakdowns, and other systemic issues. The analysis engine 112 can be used to debug complex systems (e.g., the client device 120) and answer arbitrary ad hoc questions about the systems in real time. In some implementations, the analysis engine 112 may use read time aggregation over a column store to achieve fast reads on wide data sets. For example, the analysis engine 112 may receive events (e.g., multiple individual events with associated timestamps) and use the events to calculate, for example, an overall rate of requests per second at query time. The analysis engine 112 is described in further detail herein.

The web server 114 may include computer logic executed by a processor in association with the analysis server 110 to process content requests. For instance, the web server 114 may interact with one or more of the proxy 118 and the user device 104. The web server 114 is described in further detail in reference to FIG. 5.

In some implementations, the client system 116 and/or its components may include one or more devices, such as computers, servers, etc. The proxy 118 and the client device 120 may be integrated into a single computing device or, in some instances, may be on separate computing devices in the client system 116. The proxy 118 and the client device 120 may be located within a secure network, for example, behind a firewall from the Internet or from the analysis server 110 (e.g., the analysis server 110 may be separated from the client system 116 by a firewall).

The client device 120 may include any computer that generates data to be analyzed by the analysis server 110. In some implementations, the client device 120 may include client service(s) 122 and a database 124. The client service (s) 122 may be configured to communicate with the proxy 118 to send and receive information from the proxy 118. For example, in some implementations, the client service(s) 122 may send individual events, clusters of events, or other data to the proxy 118.

In some implementations the client service(s) 122 may include one or more lightweight applications or background services for tailing existing log files, parsing content, and/or sending content to the analysis server 110 via the proxy 118. For example, the client service(s) 122 may include a daemon that may consume new content as it appears in the log files of the client device 120 and may detect when a log file rotates. In some instances, the client service(s) 122 may be configured with a key and the name of the data set to which data is written on the database 124, thereby facilitating access to the data by the client service(s) 122.

In some implementations, parser modules may be used in the client service(s) 122 depending on how data (e.g., log data) is structured. For instance, a parser module may be configured to reformat data from unstructured to structured data. This may occur on the client device 120 before or after the proxy obfuscates the data. For example, a parser module of the client service(s) 122 may format data from a group of strings to a JSON format, which may be obfuscated by the proxy 118 and used for analysis by the analysis engine 112.

The client service(s) 122 may upload all or some of the data in a log file and detect events on the client device 120 as they occur. It should be noted that the client service(s) 122 are provided as an example and that other methods exist for sending data to the analysis server 110. For example, code may be instrumented using SDKs to take existing log files and tail them prior to sending them in obfuscated form to the analysis server 110.

Figure 5:
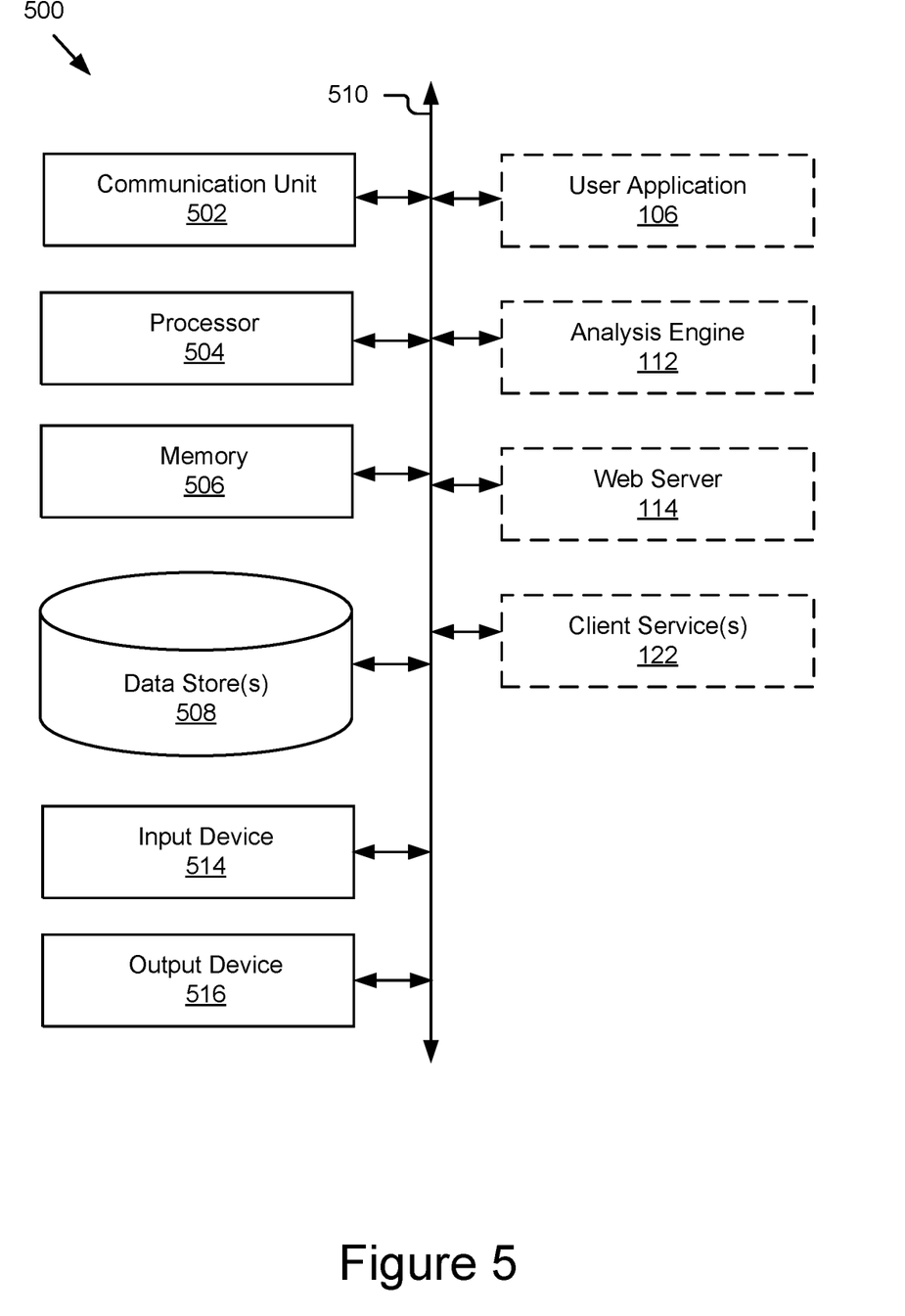
FIG. 5 is a block diagram of an example computing device in the ingest proxy and query rewriter system.

The database 124 may be stored on one or more device for storing and providing access to data, such as the data store 508 described in reference to FIG. 5. The database 124 may store original data, obfuscated data, keys, timestamps, maps, or other types of data, as described throughout this disclosure. In some implementations, the database 124 may store structured data, for example, in a MySQL database.

The proxy 118 may include a computing device or application running on the client system 116 (e.g., within a secure network with the client device 120). The proxy 118 facilitates communication among the client device 120, the analysis server 110, and the user application 106 running on the user device 104. The proxy 118 may obfuscate the data received from the client device 120 and send the obfuscated data to the analysis server 110. For example, the proxy 118 may compute hashes on the data and send the hashes to the analysis engine 112 operating on the analysis server 110. The proxy 118 may generate maps of the obfuscated data, timestamps, and/or other information, to data (e.g., un-obfuscated data) on the database 124.

In some implementations, the proxy 118 may also run a set of reversible functions, filters, transformation, or other operations on the un-obfuscated data. The operations may be applied to data points, columns, column names, types, data set names, etc. For instance, the operations may be applied by the proxy 118 on ingest (e.g., from the client device 120) and queries from the user device 104.

It should be understood that the system 100 illustrated in FIG. 1 is representative of an example system and that a variety of different system environments and configurations are contemplated and are within the scope of the present disclosure.

Figure 2:
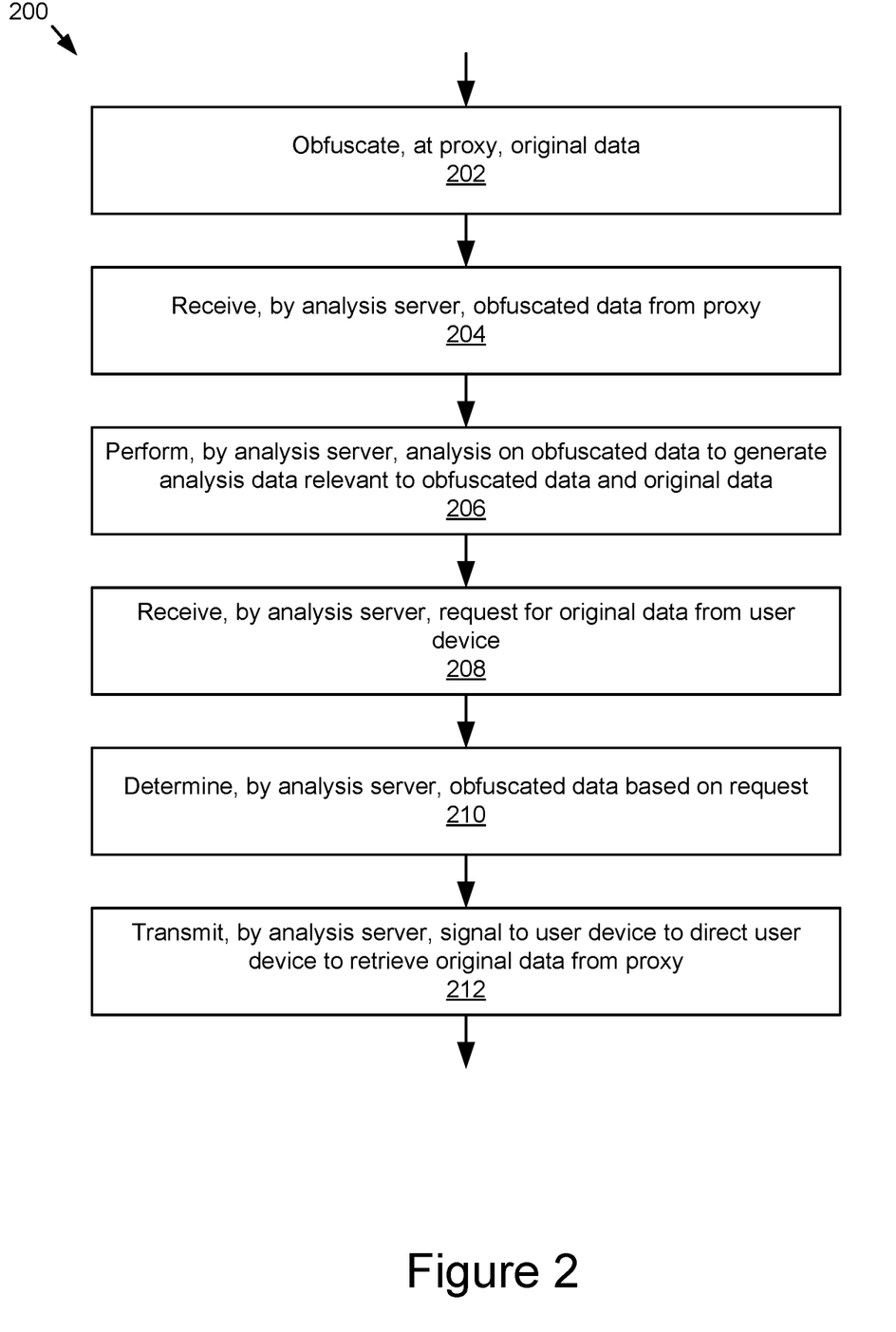
FIG. 2 is a flowchart illustrating an example method for hosting an analysis service with the ingest proxy and query rewriter system.

FIG. 2 is a flowchart illustrating an example method 200 for hosting an analysis service with the ingest proxy and query rewriter system 100.

At 202, the proxy 118 may obfuscate original data and generate a map of the obfuscated data to the received original data. In some instances, the proxy 118 may receive structured data including columns with column names and values, for example, each of which it may then obfuscate to generate the obfuscated data.

At 204, the analysis server 110 may receive the obfuscated data from the proxy 118, which may be, as indicated elsewhere herein, located at a network or physical location that is remote from the analysis server 110. In some implementations, the original data includes events and the obfuscated data includes timestamps associated with the events. For example, the original data may include log files, which may include records of events and the time that they occur on the client device 120. The client device 120 may be communicatively coupled with the proxy 118 at the network location (and/or physical location) that may be separate or remote from the analysis server 110.

At 206, the analysis server 110 may perform analysis on the obfuscated data in order to generate analysis data which is relevant to the obfuscated data and the original data. For example, analyzing the obfuscated data may include searching for patterns in the obfuscated data using timestamps, machine learning, etc. The analysis may include breaking down the obfuscated data, grouping the obfuscated data by type, column, timestamp, event, etc., generating histograms, considering rates of certain events (e.g., associated with timestamps or ranges thereof). The analysis data may provide an understanding of what is happening on the client device 120 to detect latency, bugs, and other computational problems, because the analysis may also be applicable to the original data, for example.

At 208, the analysis server 110 may receive a request for the original data from the user device 104, which may be located physically or on a network location that is separate from that of one or more of the analysis server 110 and client system 116. In some implementations, the user device 104 may be connected to the client system 116 by a VPN. The request from the user device 104 may be received by the web server 114, which may provide a user interface for interacting with the analysis server 110 via the Internet (e.g., the network 102), for example.

At 210, the analysis server 110 may determine the obfuscated data or an identification (e.g., a key, token, etc.) of the obfuscated data based on the request received from the user device 104. For example, the analysis server 110 may retrieve a hash and analysis data relating to the hash from a data storage device accessible by the analysis server 110 based on the request (the hash corresponding to the requested original data).

At 212, the analysis server 110 may transmit a signal to the user device 104 directing the user device 104 to retrieve the original data from the proxy 118. The signal may include the analysis data and/or an identification of the obfuscated data. In some instances, the user application 106 running on the user device 104 may recognize the identification of the obfuscated data (e.g., a hash) and may send a signal including the identification of the obfuscated data to the proxy 118. The proxy 118 may then lookup the original data in a map based on the identification of the obfuscated data and send the original data to the user device 104, as described in further detail elsewhere herein.

Figure 3:
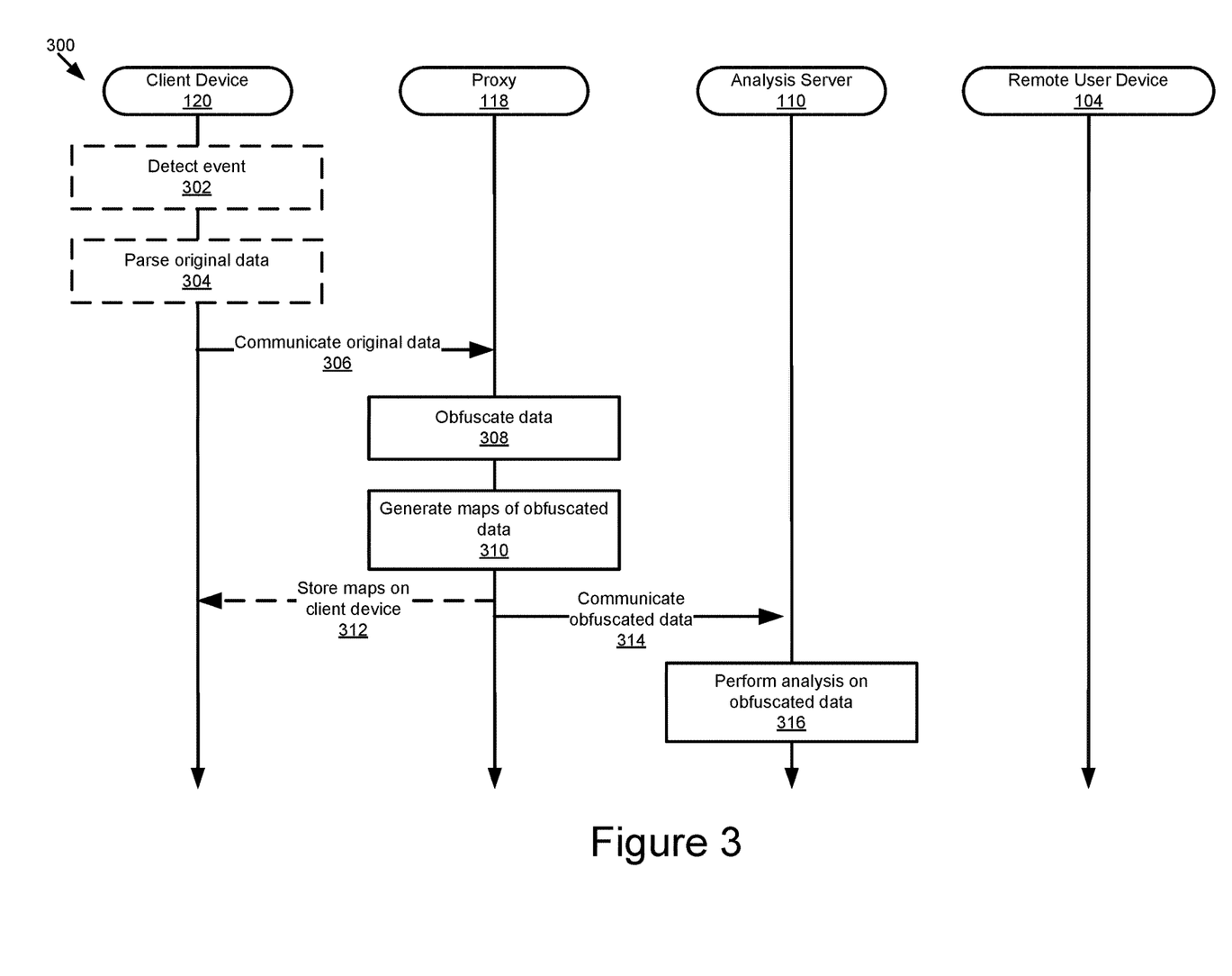
FIG. 3 is a flowchart illustrating an example method for communicating data to an analysis service in the ingest proxy and query rewriter system.

FIG. 3 is a flowchart illustrating an example method 300 for writing data to an analysis service in the ingest proxy and query rewriter system 100. In some implementations, at 302, the client device 120 (e.g., client service(s) 122 running on the client device 120) may detect an event, such as a change in log data or may otherwise receive data.

In some implementations, at 304, the client device 120 (e.g., client service(s) 122 running on the client device 120) may parse the original data. For example, the client device 120 may perform filters, transformations, tailing, or other operations on the original data. In some implementations, the client service(s) 122 may also re-structure or otherwise transform the data if the structure of the original data is different from that used by the proxy 118 and/or the analysis server 110.

At 306, the client device 120 may communicate the original data to the proxy 118 for example, in a batch or data stream.

At 308, the proxy 118 may obfuscate the original data to generate obfuscated data. In some implementations, the proxy 118 may obfuscate the data by encrypting it using, for example, symmetric encryption. In some implementations, the proxy 118 may apply a Secure Hash Algorithm (SHA) to the original data to generate the obfuscated data, although it should be noted that other obfuscation techniques are possible and contemplated herein.

In some implementations, the proxy 118 may obfuscate data strings using, for example, SHA256 HMAC (hash message authentication code). This method may allow cipher text to be invertible even if keys for hashing are rotated. In this implementation, a persistent lookup table may be stored and used invert the transformation.

In some implementations, the proxy 118 may obfuscate data strings using AES-SIV (advanced encryption standard—synthetic initialization vector). This method may allow symmetric encryption so that no lookup table is required and the cipher text may be decrypted.

In some instances, numbers may not be encrypted or otherwise obfuscated, so that the analysis engine 112 may perform aggregates on numeric columns or otherwise perform arithmetic on the numeric values. In some implementations, the proxy 118 may use homomorphic encryption for numbers, which allows certain operations on cipher text forms of numbers, which can then be decrypted to the plaintext result. In some implementations, simple masking may be used for fields that have known ranges that are smaller than int64/float64 (for integers and floats, respectively) and values can be masked by using non-1:1 functions that expand the range of values to a larger subset of the int64/float64 space.

It should be noted that comments and other forms of data may also be encrypted according to the techniques described herein.

In some implementations, the proxy 118 may assign one or more keys to the original data with which to obfuscate the original data. As indicated above, in addition to encrypting values in the original data, the proxy 118 may also encrypt column names. The keys, in some instances, may be time-stamped and rotated. For example, a data set may be assigned a key at creation time. It may be generated as dataset-key=hmac-sha256(basenji-secret, dataset-name. This may be used to hash strings that lack additional context (e.g., column names, comments, query titles, data set descriptions), for example. In some instances, a column in a data set may have its own key (which may be generated when a string value is written to the column), such as column-key=hmac-sha256(dataset-key, column-name) in addition to keys used for values in the column(s).

In some implementations, keys may be assigned timestamps so that the keys used to generate the obfuscated data may be rotated to further increase security. For instance, the timestamp may be assigned to one or more keys and may be associated with the obfuscated data and/or the original data based on when the obfuscated data was generated. For example, key rotation may not change the keys used to read data, but may change the keys used to write new data. Accordingly, invertible strings may have a timestamp associated with them that can be used to match back to the key used to perform the obfuscation (e.g., a hash). In some instances, each column name and value may be individually obfuscated and may receive the same or separate keys. In some instances, the rotation of dataset keys may cause rotation of all column keys.

Rotation of column keys may cause problems for queries if the range queried spans one or more key rotations. For example there may be one or more additional rows in the data, which may have implications for aggregating the data. For example, because the analysis (e.g., on breakdowns) may be performed on the obfuscated data or hashed value, there may be as many duplicate keys as there are key rotations. Accordingly, the proxy 118 may include additional intelligence for addressing this duplication. In some implementations, the proxy 118 may invert the string hash for the strings, or it may also do additional aggregation to combine duplicate breakdown keys.

At 310, the proxy 118 may generate maps of the obfuscated data to the original data. For example, in instances where the obfuscated data includes a hash, the proxy 118 may store a mapping of the hash or an encrypted representation of the event. In some implementations, keys and associated timestamps, if applicable, may be inserted or saved to the map based on the key assignments to the original or obfuscated data.

At 312, in some implementations, the proxy 118 may store the maps in the database 124 on the client system 116.

At 314, the proxy 118 may communicate the obfuscated data to the analysis server 110. In some instances, the transfer of data may include further encryption of the obfuscated data in a data packet as it is transferred across the network 102 to the analysis server 110, which may then decrypt the data packet, but may not de-obfuscate the obfuscated data in the data packet as the analysis server 110 lacks the keys, for example, with which to de-obfuscate the data. In some instances, the obfuscated data communicated may also include data that has not been obfuscated, such as timestamps, numbers, certain operators, etc.

At 316, the analysis server 110 may perform analysis on the obfuscated data. For example, as described elsewhere herein the analysis engine 112 may search for shapes and patterns in the obfuscated data, determine aggregates, filters, breakdowns, etc. In some implementations, the analysis engine 112 may perform string matches, run the data with its associated timestamps through a computer learning algorithm, etc., to draw out anomalies in the data, patterns, and so forth.

The analysis may include aggregating numeric data and the obfuscated data (e.g., which may not be obfuscated, in some instances), for example, if the aggregation functions have an inverse and the relative ordering of information is maintained.

The analysis may include filtering the data. For example, for numeric fields, the logical operators (>, >=, <, <=, ==, !=) may remain the same if the filtering function is 1:1, and turn into two filters otherwise (range operations based on the functions above). For string files, == and != may turn into a group of {OR, ==} or a group of {AND, !=} filters, respectively (depending on if identical strings map to identical hashes.). Other string operations, such as "starts-with," "contains," etc., may be omitted from the analysis or may be included, for instance, if the proxy 118 iterates the list of all values it knows about and turns them into a group of {OR, ==} filters. It should be noted that although these functions are described as being performed on the analysis engine 112, they may also or alternatively be performed on the proxy 118 or the client device 120, depending on the implementation.

In some implementations, the analysis server 110 may set a reverse translator hook. The reverse translator hook may be called by the user application 106 when fetching or showing certain data, such as team names, column metadata, and values from the analysis server 110 and/or proxy 118.

It should be noted that, although the proxy 118 is described herein as obfuscating the data, generating the maps, and assigning keys, in some implementations, these operations may be performed by the client device 120 without departing from the scope of this disclosure.

Figure 4:
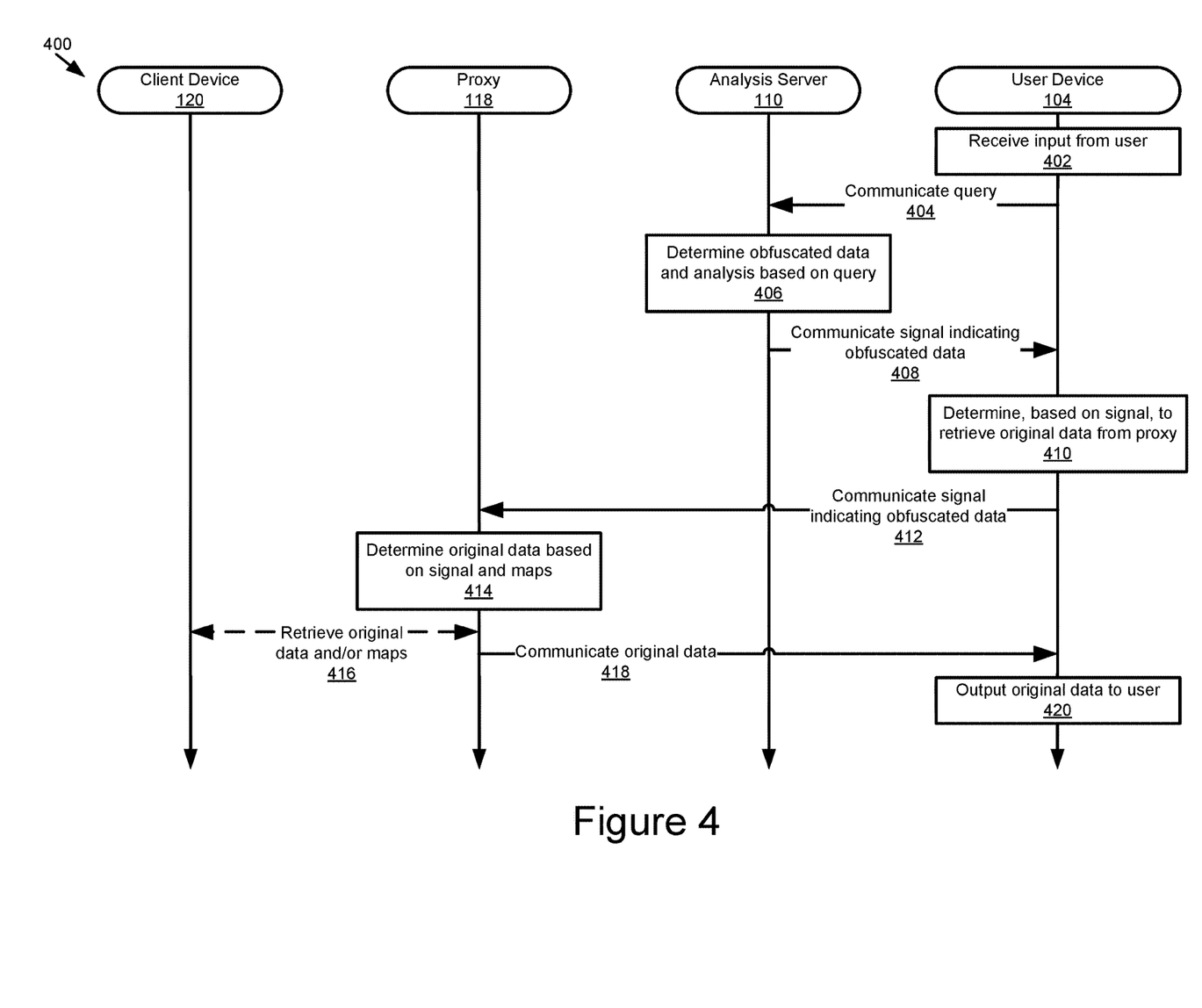
FIG. 4 is a flowchart illustrating an example method for reading data from an analysis service and proxy in the ingest proxy and query rewriter system.

FIG. 4 is a flowchart illustrating an example method 400 for reading data from an analysis service and proxy in the ingest proxy and query rewriter system 100. At 402, the user device 104 may receive input from user indicating to retrieve one or more of analysis data and original data from the analysis server 110. For example a browser or other user application 106 operating in the user device 104 may receive data access request to access the original data corresponding to analysis data while interacting with a user interface on the analysis server 110.

At 404, the user device 104 may communicate the query in a signal to the analysis server 110 (which may be received by a web server 114) and, at 406, the analysis server 110 may determine the obfuscated data and analysis data based on the query. For example, the query may request that the analysis server 110 provide one or both of analysis data and the corresponding original data (e.g., un-obfuscated data). Because the analysis engine 112 does not have access to the corresponding original data, it may retrieve the identification of the obfuscated data (e.g., a hash value) and, in some instances, may insert the identification of the obfuscated data into the analysis data to be sent to the user device 104 or, in some instances, may send the identification of the obfuscated data in a separate signal to the user device 104.

At 408, the analysis server 110 may communicate a signal to the user device 104 identifying the obfuscated data and, in some instances, directing the user device 104 to seek the original data from the proxy 118 based on the identification of the obfuscated data.

At 410, in some implementations, the user device 104 may determine, based on the signal received from the analysis server 110, to retrieve the original data from the proxy 118. For example, in instances where the obfuscated data (or an identification of the obfuscated data) includes a hash value of the original data, a user application 106 may recognize the hash value, and may automatically seek the original data from the proxy 118 based identification of the hash value.

At 412, the device may communicate a signal identifying the obfuscated data to the proxy 118. For example, a browser operating on the user device 104 may send a request including a hash of the original data to the proxy 118. The signal may request that the proxy 118 send the un-obfuscated data corresponding to the hash to the user device 104. In some implementations, the user device 104 may communicate the request via a VPN that has previously been established between the user device 104 and the client system 116. In some implementations, the user device 104 may automatically determine, when seeking information from the proxy 118, to establish a secure connection (e.g., a VPN connection). The establishment of the secure connection may occur automatically or with input by the user.

At 414, the proxy 118 may determine, generate, or retrieve original data corresponding to the identification of the obfuscated data based on the signal received from the user device 104 and the maps stored in the database 124. In some implementations, when the original data and/or the maps are not stored on the proxy 118, the proxy 118 may retrieve, at 416, the original data and/or the maps for identifying the original data from a database 124. The proxy 118 may then use these maps to determine or retrieve the original data.

In some implementations, such as when keys for obfuscating the data are rotated, the proxy 118 may determine the appropriate key to use to de-obfuscate the obfuscated data or to retrieve the original data based on the maps, timestamps, or other identification of the obfuscated data. For example, the proxy 118 may de-obfuscate the obfuscated data using the one or more keys. In another example, the proxy 118 may determine which data to retrieve from the database 124 based on the one or more keys.

In some implementations, the proxy 118 or the client device 120 may execute functions such transformations, filtering, or other operations on the original or un-obfuscated data prior to communicating the original data to the user device 104.

At 418, the proxy 118 may communicate the original data to the user device 104. For example, the proxy 118 may send the original data to the browser in the original structured data format or in another format dictated by any transformations, etc., performed by the proxy 118.

At 420, the user device 104 (e.g., a user application 106 or browser operating on the user device 104) may receive the original data from the proxy 118 and output it to the user. In some implementations, the user application 106 may seamlessly combine the original data received from the proxy 118 with the analysis data received from the analysis server 110 based on the signal received from the analysis server 110. For example, in a string of data received from the analysis server 110, the browser may automatically replace the identification of the original data with the original data in order to provide a seamless user experience to the user as though both the analysis data and the original data are received from the analysis server 110.

FIG. 5 is a block diagram of an example computing device 500 in the ingest proxy 118 and query rewriter system 100. The example computing device 500 may represent the computer architecture of a client device 120, the proxy 118, a user device 104, or an analysis server 110, as depicted in FIG. 1, depending on the implementation.

As depicted in FIG. 5, the computing device 500 may include a user application 106, an analysis engine 112, a web server 114, or client service(s) 122, depending on the configuration. For instance, a client device 120 may include the client service(s) 122; a user device 104 may include the user application 106; and the analysis server 110 may include one or more of the analysis engine 112 and web server 114; although other configurations are also possible and contemplated.

The user application 106 includes computer logic executable by the processor 504 on a user device 104 to provide for user interaction, receive user input, present information to the user via a display, and send data to and receive data from the other entities of the system 100 via the network 102. In some implementations, the user application 106 may generate and present user interfaces based at least in part on information received from the analysis server 110 and/or the proxy 118 via the network(s) 102. The user application 106 may perform other operations described herein.

The analysis engine 112 may include computer logic executable by the processor 504 to perform operations discussed elsewhere herein. The analysis engine 112 may be coupled to the data stores 508 to store, retrieve, and/or manipulate data stored therein and may be coupled to the web server 114, the proxy 118, and/or other components of the system 100 to exchange information therewith.

The proxy 118 may include computer logic executable by the processor 504 to perform operations discussed elsewhere herein. The proxy 118 may be coupled to the data stores 508 to store, retrieve, and/or manipulate data stored therein and may be coupled to the web server 114, the analysis engine 112, the client device 120, the user device 104, and/or other components of the system 100 to exchange information therewith.

The web server 114 may include computer logic executable by the processor 504 to process content requests. The web server 114 may include an HTTP server, a REST (representational state transfer) service, or other suitable server type. The web server 114 may receive content requests (e.g., product search requests, HTTP requests) from user device 104, cooperate with the analysis engine 112 to determine content, retrieve and incorporate data from the data stores 508, format the content, and provide the content to the user device 104.

In some instances, the web server 114 may format content using a web language and provide the content to a corresponding user application 106 for processing and/or rendering to the user for display. The web server 114 may be coupled to the data stores 508 to store, retrieve, and/or manipulate data stored therein and may be coupled to the analysis engine 112 to facilitate its operations, for example.

As depicted, the computing device 500 may include a processor 504, a memory 506, a communication unit 502, an output device 516, an input device 514, and a data stores 508, which may be communicatively coupled by a communication bus 510. The computing device 500 depicted in FIG. 5 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing device 500 may include various operating systems, sensors, additional processors, and other physical configurations. The processor 504, memory 506, communication unit 502, etc., are representative of one or more of these components.

The processor 504 may execute software instructions by performing various input, logical, and/or mathematical operations. The processor 504 may have various computing architectures to method data signals (e.g., CISC, RISC, etc.). The processor 504 may be physical and/or virtual, and may include a single core or plurality of processing units and/or cores. In some embodiments, the processor 504 may be coupled to the memory 506 via the bus 510 to access data and instructions therefrom and store data therein. The bus 510 may couple the processor 504 to the other components of the computing device 500 including, for example, the memory 506, the communication unit 502, the input device 514, the output device 516, and the data stores 508.

The memory 506 may store and provide access to data to the other components of the computing device 500. The memory 506 may be included in a single computing device or a plurality of computing devices. In some implementations, the memory 506 may store instructions and/or data that may be executed by the processor 504. For example, the memory 506 may store one or more of the user application 106, analysis engine 112, web server 114, client service(s) 122, and their respective components, depending on the configuration. The memory 506 is also capable of storing other instructions and data, including, for example, an operating system, hardware drivers, other software applications, databases, etc. The memory 506 may be coupled to the bus 510 for communication with the processor 504 and the other components of computing device 500.

The memory 506 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 504. In some embodiments, the memory 506 may include one or more of volatile memory and non-volatile memory (e.g., RAM, ROM, hard disk, optical disk, etc.). It should be understood that the memory 506 may be a single device or may include multiple types of devices and configurations.

The bus 510 can include a communication bus for transferring data between components of a computing device or between computing devices, a network bus system including the network 102 or portions thereof, a processor mesh, a combination thereof, etc. In some embodiments, the components operating on the computing system/device 500 (operating systems, device drivers, etc.) may cooperate and communicate via a communication mechanism included in or implemented in association with a bus 510. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 502 may include one or more interface devices (I/F) for wired and wireless connectivity among the components of the system 100. For instance, the communication unit 502 may include, but is not limited to, various types known connectivity and interface options. The communication unit 502 may be coupled to the other components of the computing device 500 via the bus 510. The communication unit 502 can provide other connections to the network 102 and to other entities of the system 100 using various standard communication protocols.

The input device 514 may include any device for inputting information into the computing device 500. In some embodiments, the input device 514 may include one or more peripheral devices. For example, the input device 514 may include a keyboard, a pointing device, microphone, an image/video capture device (e.g., camera), a touch-screen display integrated with the output device 516, etc. The output device 516 may be any device capable of outputting information from the computing device 500. The output device 516 may include one or more of a display (LCD, OLED, etc.), a printer, a 3D printer, a haptic device, audio reproduction device, touch-screen display, a remote computing device, etc. In some embodiments, the output device is a display which may display electronic images and data output by a processor of the computing device 500 for presentation to a user, such as the processor 504 or another dedicated processor.

The data stores 508 are information sources for storing and providing access to data. In some embodiments, the data stores 508 may store data associated with a database management system (DBMS) operable on the computing device 500. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The data stored by the data stores 508 may organized and queried using various criteria including any type of data stored by them, such as described herein. The data stores 508 may include data tables, databases, or other organized collections of data. Examples of the types of data stored by the data stores 508 may include, but are not limited to the data described with respect to the figures, for example.

The data stores 508 may be included in the computing device 500 or in another computing system and/or storage system distinct from but coupled to or accessible by the computing device 500. The data stores 508 can include one or more non-transitory computer-readable mediums for storing the data. In some embodiments, the data stores 508 may be incorporated with the memory 506 or may be distinct therefrom.

It should be understood that the methods described herein are provided by way of example, and that variations and combinations of these methods, as well as other methods, are contemplated. For example, in some embodiments, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining,"

"displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing systems, entities, and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
   receiving, by an analysis server, obfuscated data from a remote proxy, the obfuscated data being an obfuscated version of original data, the remote proxy being located at a remote network location from the analysis server, the original data including events and the obfuscated data including timestamps associated with the events;
   generating, by the analysis server, analysis data relevant to the obfuscated data and to the original data by analyzing the obfuscated data, analyzing the obfuscated data including searching for patterns in the obfuscated data using the timestamps;
   receiving, by the analysis server, a request from a remote user device for the analysis server to send the original data and the analysis data to the remote user device;
   retrieving, by the analysis server, the obfuscated data and the analysis data from a database based on the request; and
   transmitting, by the analysis server, the analysis data and a signal to the remote user device identifying the obfuscated data, the signal directing the remote user device to retrieve the original data from the remote proxy and replace the identification of the obfuscated data in the analysis data with the original data.

2. The computer-implemented method of claim 1, wherein the original data includes log files, the log files including records of events that occur on a remote client device, the remote client device being communicatively coupled with the remote proxy.

3. The computer-implemented method of claim 2, wherein the analysis server is separated from the remote client device and the remote proxy by a firewall.

4. The computer-implemented method of claim 1, wherein:
   the obfuscated data includes a hash value of the original data;
   the remote user device is configured to detect the hash value received from the analysis server and to automatically send the hash value to the remote proxy; and
   the remote user device is connected to the remote proxy via a virtual private network when the remote user device is sending the signal to the remote proxy and receiving the original data from the remote proxy.

5. A system comprising:
   a remote proxy configured to transmit obfuscated data to an analysis server, the remote proxy being located at a remote network location from the analysis server, the obfuscated data being an obfuscated version of original data, the original data including events and the obfuscated data including timestamps associated with the events;
   the analysis server configured to
      receive the obfuscated data from the remote proxy;
      generate analysis data relevant to the obfuscated data and to the original data by analyzing the obfuscated data, analyzing the obfuscated data including searching for patterns in the obfuscated data using the timestamps;
      retrieve the obfuscated data and the analysis data from a database based on a request received from a remote user device;
      transmit the analysis data to the remote user device; and
      transmit a signal to the remote user device identifying the obfuscated data in the analysis data; and
   the remote user device configured to
      transmit the request to the analysis server to send the original data and the analysis data to the remote user device; and
      retrieve the original data from the remote proxy and replace an identification of the obfuscated data in the analysis data with the original data in response to receiving the signal.

6. The system of claim 5, wherein the original data includes log files, the log files including records of events that occur on a remote client device, the remote client device being communicatively coupled with the remote proxy.

7. The system of claim 5, wherein:
   the obfuscated data includes a hash value of the original data; and
   the remote user device is further configured to detect the hash value received from the analysis server and to automatically send the hash value to the remote proxy.

8. The system of claim 5, wherein the remote user device is connected to the remote proxy via a virtual private network when the remote user device receives the original data from the remote proxy.

9. The system of claim 5, wherein:
   the remote proxy is further configured to
      receive, from a client device, original data;
      obfuscate the original data to generate the obfuscated data; and
      generate a map of the obfuscated data to the original data.

10. The system of claim 9, wherein:
    the remote proxy is further configured to
       determine the original data corresponding to the obfuscated data using the map and the request received from the remote user device; and
       transmit the original data to the remote user device.

11. The system of claim 9, wherein obfuscating the original data to generate the obfuscated data includes applying a secure hash algorithm to the original data.

* * * * *